Patented Mar. 7, 1933

1,900,444

UNITED STATES PATENT OFFICE

HERMAN HEUSER, OF EVANSTON, ILLINOIS

PRESERVED EGG AND PROCESS OF MAKING SAME

No Drawing.　　Application filed March 27, 1929. Serial No. 350,442.

Egg deprived of the shell, either in the form of whole egg, the yolk of egg or the white of egg, is usually preserved by drying or desiccating. Egg preserved in this manner, i. e. dried egg, is commonly vended as a food product in trade packages from store shelves, and as such is subject to various objections. Thus, it possesses a more or less objectionable odor produced in part in the drying process and increased during storage in the trade packages. It also has the further disadvantage that it does not possess the property of foam production when it is beaten, or the property of raising, important in the baking of cakes, to the same extent as the raw egg possesses these properties. Furthermore, its vitamin content is impaired by the heat employed in the drying process.

Egg yolk also is often preserved by freezing. Frozen egg yolk possesses but limited keeping qualities because of its deterioration by micro-organisms soon after its removal from cold storage, and is unsatisfactory because of the precipitation of a substantial portion of the proteins by the cold, thereby reducing its cake raising quality and depreciating its appearance. In view of these objections, the use of frozen egg yolk usually is limited to industrial plants, such as bakeries and ice cream factories. These plants are supplied with the frozen egg directly from cold storage so as to reduce the time of exposure to normal temperatures as much as possible.

The primary object of my invention is to preserve egg deprived of the shell in any of its forms so effectively that it will be a durable commercial article.

A more specific object is to preserve egg deprived of the shell in any of its forms, without employing heat or cold, which will not be subject to deterioration by micro-organisms when outside of cold storage for any length of time but will remain unspoiled and fresh, which usually will be lower in price than the prevailing price of fresh egg in the shell, and which therefore can be sold as a commercial food product from stock on store shelves to the general public.

Another object resides in the provision of an egg preserve in the form of a syrup having good keeping qualities.

I will now describe a suitable process by which the egg in any of its forms may be preserved in accordance with my invention.

At the start, whole egg of good quality, free from objectionable smell and taste is deprived of the shell. A suitable sugar, such as granulated sucrose, now is added to the egg in such a proportion that an egg syrup which will not be subject to deterioration by micro-organisms outside of cold storage will finally be produced. Preferably, the mixture should contain at least 50 per cent of sugar. The egg and the sugar are mixed together until the mixture is uniform, i. e. until it is free from all solid particles of egg and sugar. I have observed that when whole egg or any one of its parts is used, the mixture thus produced is in the form of an emulsion or cream substantially white in color.

Egg emulsion contains a substantial amount of air which promotes the growth of fungi and bacteria. As a result, the emulsion or cream of egg produced by the incorporation of a preserving quantity of sucrose is not proof against deterioration by micro-organisms outside of cold storage, but very readily takes on a sour smell and taste due to the fermenting action of fungi and lactic acid bacteria.

The emulsion or cream therefore is now broken up to form a syrup. I have discovered that this may be accomplished by subjecting the emulsion to centrifugal force either in a batch operation or in a continuous operation. In the batch operation, the emulsion is put into a container, and the latter is rotated about a central point at a suitable speed until the entire batch has changed into a syrup. Obviously, the speed and the time required may vary with the design of the apparatus. If, for example, the distance of the batch from the center of rotation is approximately seven inches, the change can be accomplished in a very short time by a speed of from 2,000 to 3,000 revolutions per minute. In the continuous operation, the emulsion is passed continuously into the sphere of centrifugal force, and then away therefrom, care being taken to prevent substantial agitation of the syrup so as to avoid any reproduction of an emulsion or cream. The continuous operation is best adapted to the preservation of egg on a large scale.

I have also discovered that the egg emulsion may be broken up into a syrup by subjecting same to a suitable vacuum. Thus, I have successfully employed a vacuum which initially is increased up to 25 millimeters from absolute, and thereafter lies between 25 millimeters and absolute. Preferably, the vacuum repeatedly is raised rapidly to this height, and then released substantially to zero until the emulsion or cream has been changed completely into a syrup. The vacuum serves to expand the emulsion into a foam, and the release of the vacuum serves to break the foam. During the operation, approximately 2 per cent of moisture is evaporated. Since the heat necessary for the evaporation is taken from the material, the latter is cooled.

The syrup thus produced either by centrifuging or by vacuumizing the whole egg emulsion or cream is durable, and instead of possessing the substantially white color of the emulsion, possesses the natural deep lemon yellow color of raw egg.

The preservation of egg yolk may be carried out in the same manner as the preservation of whole egg. Preferably, however, the emulsion of egg yolk and sugar because of its relatively high viscosity is changed into a syrup by centrifugal action, and not by the use of a vacuum.

In connection with the preservation of egg yolk, I have discovered that if the moisture content which normally is approximately 50%, is suitably increased, it is easier to handle the emulsion and also the syrup produced therefrom. Therefore, I prefer to raise the moisture content of the yolk substantially to the moisture content of whole egg on the market which averages about 64 per cent. To this end, preferably distilled water or filtered soft water is added to the egg yolk before the sugar is added. The sugar added subsequently should comprise at least 50 per cent of the entire mixture.

The invention also is adapted for the successful preservation of white of egg in substantially the same manner as the preservation of whole egg. White of egg contains a comparatively large percentage of moisture, approximately 86%. Preferably, this moisture content is suitably reduced, as by evaporation, for example to a percentage lying between the moisture content of freshly laid eggs, which is about 73 per cent and the moisture content of eggs, when purchased in the market, which averages about 64 per cent. The evaporation is carried out at a temperature such that the raw egg albumen is not converted into denatured albumen. A temperature below 100° F., preferably about 70° F., is suitable. Thereafter, the sugar is added, and the process is carried out as in the preservation of whole egg. The syrup of the white of egg is durable, very clear, and possesses hardly any color except a touch of yellow.

In order to remove any traces of oxygen that may be introduced into the egg syrups when being filled into trade packages, I prefer to add a non-toxic reducing agent, such as sodium hypophosphite or any other suitable phosphite. Ordinarily, from 0.1 to 0.25 per cent of sodium hypophosphite is added.

Instead of sucrose, any other suitable sugar, may be used in carrying out the invention. Thus, maltose and dextrose are suitable when a moderately sweet egg product is desired. However, I prefer to use the disaccharides because of their greater preserving power.

It will be obvious that sugar either in the solid form or in syrup form may be used. Sugar in solid form is preferred, particularly in preserving whole egg and white of egg, because of its relatively low moisture content. However, sugar in syrup form, for example maltose syrup or concentrated wort syrup, is well adapted for use in preserving egg yolk, since the latter can well utilize additional moisture.

The egg syrups produced by the foregoing process are marketed in hermetically sealed containers, such as cans, jars, or bottles, and are sold directly from the shelf stock in groceries, or other stores. The syrups will not deteriorate on standing, even though exposed to ordinary temperatures. The whole egg syrup and the egg yolk syrup can be used in the household in the preparation of cakes, custards, puddings, ice cream, etc. The white of egg syrup is particularly suited for the preparation of whipped cream. The syrups, particularly the whole egg syrup and the egg yolk syrup, contain highly valuable proteins, fats, and phosphates, fully preserved in the foregoing process, and hence are also adapted for consumption as a nourishing and wholesome food stuff. The term "egg" by itself or in connection with the word "syrup", as used generically in the claims, is intended to mean the whole of egg as well as the egg yolk and the white of egg.

I claim as my invention:

1. The process of preserving egg in the absence of applied heat which consists in incorporating into the egg a preserving quantity of sugar to form an emulsion, and subjecting the emulsion to centrifugal action of sufficient force to convert the emulsion into a raw egg syrup substantially free of emulsion air.

2. The process of preserving egg in the absence of applied heat or cold which consists in incorporating into the egg a preserving quantity of sugar to form an emulsion, and subjecting the emulsion to a vacuum of sufficient power to break down the emulsion into a raw egg syrup substantially free of emulsion air.

3. The process of preserving egg in the absence of applied heat which consists in incorporating a preserving quantity of sugar into the raw egg to form an emulsion, and breaking down the emulsion to form a raw egg syrup free from emulsion air.

4. The process of preserving egg in the absence of applied heat or cold which consists in incorporating into the egg a preserving quantity of sugar to form an emulsion, and subjecting the emulsion to repeated vacuum impulses to convert the emulsion into a raw egg syrup substantially free from emulsion air.

5. The process of preserving egg which consists in incorporating into the raw egg, a quantity of sugar comprising at least 50 per cent of the mixture by weight, and converting the mixture to form a raw egg syrup substantially free from emulsion air.

6. The process of preserving egg which consists in incorporating into the egg a preserving quantity of sugar to form an emulsion, converting the emulsion into a syrup free from emulsion air, and adding a non-toxic reducing agent to the syrup.

7. The process of preserving egg which consists in incorporating into the egg a preserving quantity of sugar to form an emulsion, converting the emulsion into a syrup free from emulsion air, and adding a phosphite to the syrup.

8. The process of preserving egg yolk in the absence of applied heat which consists in adding moisture to the yolk, incorporating a preserving quantity of sugar into the yolk, and subjecting the mixture to a physical force sufficient to convert said mixture into a raw egg syrup free from emulsion air.

9. The process of preserving the white of egg in the absence of applied heat which consists in decreasing the moisture content of the white of egg, incorporating a preserving quantity of sugar into the white of egg to form an emulsion and converting the emulsion into a raw egg syrup free from emulsion air.

10. A sugar preserved raw egg syrup free from emulsion air containing at least 50 per cent. of sugar the syrup being enclosed out of substantial contact with air in an hermetically sealed container.

11. A preserved raw egg syrup containing a preserving quantity of sugar and a nontoxic reducing agent and being free from emulsion air and occluded air.

12. The process of preserving raw egg which consists in incorporating sugar into the egg in an amount comprising at least 50% of the mixture by weight, subjecting the resulting emulsion to centrifugal action of sufficient force to convert the emulsion into a raw egg syrup substantially free of emulsion air, adding a non-toxic reducing agent to the syrup, the foregoing steps being carried out at normal atmospheric temperature, and sealing the syrup in a closed container.

In testimony whereof, I have hereunto affixed my signature.

HERMAN HEUSER.